(12) United States Patent
Crum et al.

(10) Patent No.: US 6,629,832 B1
(45) Date of Patent: Oct. 7, 2003

(54) APPARATUS FOR MOLDING AN END OF AN ANNULAR ARTICLE

(75) Inventors: James E. Crum, Waterville, OH (US); V. Lincoln Hall, Waterville, OH (US)

(73) Assignee: Crum Manufacturing, Inc., Waterville, OH (US)

( * ) Notice: Subject to any disclaimer, the term of this patent is extended or adjusted under 35 U.S.C. 154(b) by 233 days.

(21) Appl. No.: 09/923,476

(22) Filed: Aug. 7, 2001

(51) Int. Cl.[7] ............................................. B29C 53/08
(52) U.S. Cl. ............... 425/393; 425/403; 425/DIG. 218
(58) Field of Search ............................... 425/392, 393, 425/403, 469, DIG. 218; 249/175, 177; B29C 53/08

(56) References Cited

U.S. PATENT DOCUMENTS

| | | | |
|---|---|---|---|
| 4,298,330 A | * 11/1981 | Davis | 425/392 |
| 5,038,455 A | 8/1991 | Guest | |
| 5,424,015 A | * 6/1995 | Matsuda et al. | 425/392 |
| 5,773,046 A | * 6/1998 | Roby | 425/393 |

* cited by examiner

Primary Examiner—Robert Davis
Assistant Examiner—Thu Khanh T. Nguyen
(74) Attorney, Agent, or Firm—Emch, Schaffer, Schaub & Porcello Co., L.P.A.; Thomas A. Meehan

(57) ABSTRACT

Apparatus for molding an annular article, such as a radiator hose, from an organic material, such as an elastomeric material, the apparatus having a mandrel with an external surface against which an inner surface of the article is molded. The mandrel also has an end extension of reduced radial extent and an end cap is releaseably secured to the extension to provide a generally transversely extending annular surface against which an end of the article is molded. The end cap has a passage extending therethrough at a location adjacent to an adjacent portion of the extension and in a plane extending generally transversely to a longitudinal centerline of the article, and the shank of a generally J-shaped locking member is slidably inserted in the passage. The locking member is resiliently biased towards a position where a portion of the locking member disengageably engages an annular recess in the extension to lock the end cap in position relative to the extension.

8 Claims, 2 Drawing Sheets

APPARATUS FOR MOLDING AN END OF AN ANNULAR ARTICLE

FIELD OF INVENTION

This application relates to apparatus for molding an end of an annular article, for example, an elastomeric radiator hose. More particularly, this invention relates to apparatus having an end cap against which an end of the article is molded, the end cap being quickly disengageable from a mandrel around which the body of the article is molded.

BACKGROUND OF THE INVENTION

As is known in the art, annular articles of an organic material, such as elastomeric radiator hoses, are molded by introducing a moldable organic material into an annulus having an inner mandrel with an outer surface against which the material is molded. The apparatus for such a molding operation often includes an end cap that is releasably secured to the inner mandrel, the end cap having a transversely extending annular surface against which the adjacent end of the molded article is molded to provide the article with an as molded end. However, heretofore the attachment of the end cap to the mandrel was not readily disengageable, which results in undesirable delays in setting up a production molding apparatus for a production run.

BRIEF DESCRIPTION OF THE INVENTION

According to the present invention, there is provided molding apparatus for molding an annular organic item, such as an elastomeric radiator hose, the molding apparatus having a mandrel with an outer surface against which an inner surface-of the molded article is molded. The mandrel has an integral reduced diameter end extension that extends outwardly beyond the end of the article being molded, and an end cap is releasably secured to the mandrel extension. The end cap has a transversely extending annular surface and the adjacent end of the article being molded is molded against the annular surface of the end cap.

The end cap has a generally J-shaped locking member extending through it, with the shank of the locking member being positioned at a location removed from the centerline of the end cap. The locking member is moveable within and with respect to the end cap between a first position, where an inner end of the locking member is lockingly received in a recess in the mandrel extension, and a second position, where the inner end of the locking member is not received in the recess in the mandrel extension. The locking member, which has another end that extends beyond an outer surface of the end cap, is resiliently biased to its first position. Thus, simply by manually depressing the exposed other end of the locking member, the end cap may quickly be disengaged from the mandrel extension, and it may be quickly re-engaged by a similar procedure and in a predetermined positional relationship to the mandrel extension.

Accordingly, it is an object of the present invention to provide improved molding apparatus for molding an annular article from an organic material. More particularly, it is an object of the present invention to provide molding apparatus of the foregoing character in which the molded article is provided with an as molded annular end surface. More particularly, it is an object of the present invention to provide apparatus with the foregoing, character having a mandrel with a mandrel extension and an end cap against which the end of the annular article is molded, with the end cap being readily disengageable from the mandrel extension and readily re-engageable with the mandrel extension and in a predetermined positional relationship therewith.

For a further understanding of the present of the invention and the objects thereof, attention is directed to the drawing and the following brief description thereof, to the detailed description of the invention and to the appended claims.

DETAILED DESCRIPTION OF THE INVENTION

Figure 1:
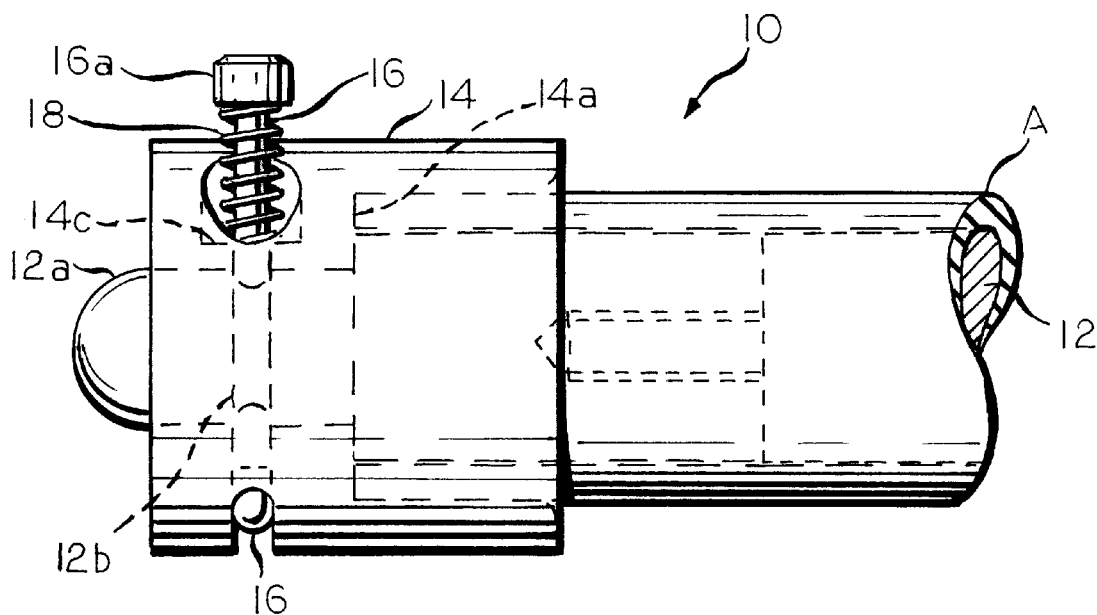
FIG. 1 is an elevation view, partly in cross-section, of apparatus according to the preferred embodiment of the present invention.
Figure 2:
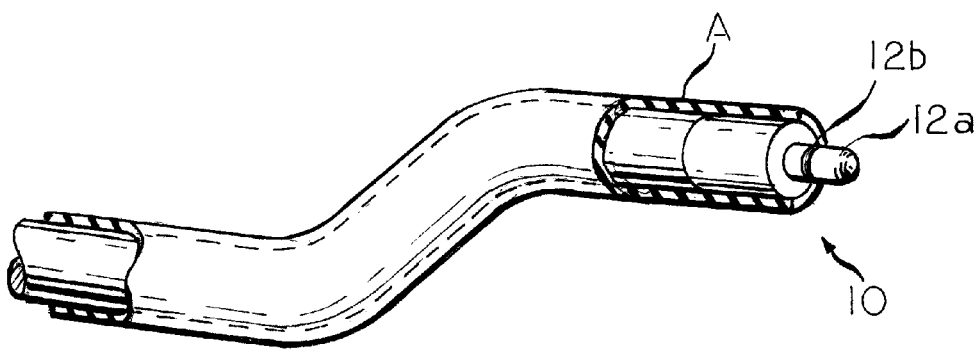
FIG. 2 is a perspective view, at a reduced scale, showing the apparatus of FIG. 1 in use in the molding of an annular article.
Figure 3:
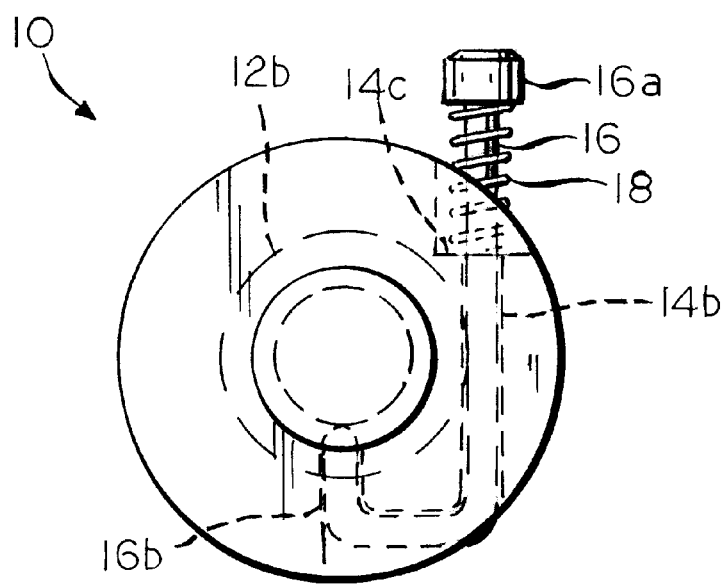
FIG. 3 is an end view of the apparatus of FIG. 1.
Figure 4:
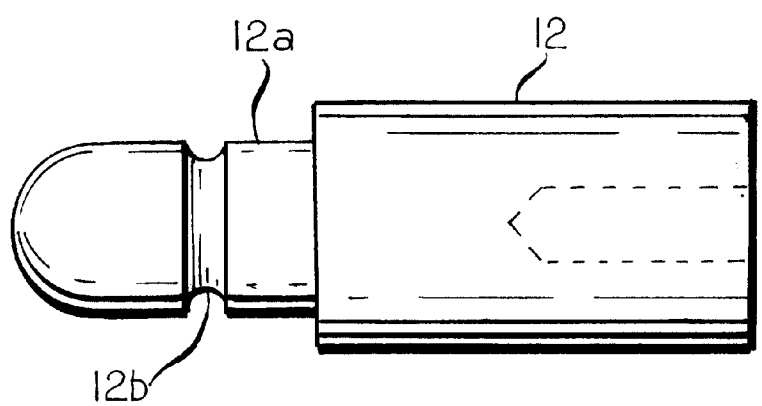
FIG. 4 is an elevation view of a portion of the apparatus of FIGS. 1–3.

Molding apparatus according to the preferred embodiment of the present invention is identified generally by reference numeral 10 in the drawing. The apparatus 10 includes a mandrel 12, which is shown as having the cross-sectional configuration of a right circular cylinder, and a generally cupped-shaped end cap 14. The end cap 14 is releasably secured to an integral extension 12a of reduced radial extent of the mandrel 12. An annular article A of an organic material, for example, an elastomeric material in the case of an annular article that is a radiator hose, is molded against the mandrel 12, with an inner surface of the article A being molded against an outer surface of the mandrel 12. Further, an annular end surface of the article A is molded against a transversely extending annular surface 14a of the end cap 14 to provide the article A with an as-molded end.

The end cap 14 is provided with a generally J-shaped locking member 16, and a shank portion of locking member 16, which has an outwardly extending head 16a, extends through a passage 14b in the end cap 14. The passage 14b extends through the end cap 14 along a line that is spaced from a longitudinal centerline of the end cap 14 and in a plane that extends perpendicularly to the longitudinal centerline of the end cap 14. The extension 12a is provided with an annular recess 12b, and the locking member is moveable between a first position, where an inner free end of the locking member 16b extends into the recess 12b to positively lock the end cap 14 to the extension 12a, and a second position, where the inner free end 16b of the locking member 16 does not extend into the recess 12b. The locking member 16 is resiliently biased to a first position by a spring 18 that is trapped between the head 16a and a shoulder 14c in the end cap 14, but is readily manually disengageable from the first position by manually depressing the head 16a of the locking member 16. Thus, in the second position of the locking member 16, the end cap may be quickly disengaged from the extension 12a of the mandrel 12; conversely, in the second position of the locking member 16, the end cap 14 may be quickly re-engaged to the extension 12a and in a fixed or predetermined positional relationship therewith.

Though the best mode contemplated by the inventors for carrying out the present invention as of the filing date hereof has been shown and described herein, it will be apparent those skilled in the art that suitable modifications, variations, and equivalents maybe made without departing from the scope of the invention such scope being limited solely by the terms of the following claims and the legal equivalents thereof.

We claim:

1. Apparatus for molding an annular article of an organic material, said apparatus comprising:

a mandrel having a body portion with an external surface, an annular inner surface of the annular article being moldable against said external surface, said mandrel further having an extension at an end of said body portion, said extension having less radial extent than said body portion, said extension further having a recess therein;

an end cap releasably secured to said extension of said mandrel, said end cap having a transversely extending annular surface against which an end surface of the article is moldable, said end cap further having a passage extending therethrough and in a plane extending generally transversely to a longitudinal centerline of said extension, said passage having a main portion that is spaced from the longitudinal centerline of said extension by a distance at least equal to the radial extent of an adjacent portion of said extension;

a locking member having a portion extending through said passage, said portion of said locking member being moveable within said passage between a first position and a second position, said portion of said locking member further having a second portion extending from an end of said portion, said second portion being engageable with said recess and said extension of said mandrel in one of said first position and said second position of said portion of said locking member and being out of engagement with said recess in the other of said first position and said second position of said portion of said locking member; and manually engageable and resiliently biased means for normally maintaining said second portion of said locking member in said one of said first position and said second position of said locking member.

2. Apparatus according to claim 1 wherein said manually engageable and resiliently biased means comprises:

a free end portion of said portion of said locking member, the free end portion being positioned externally to said end cap both in said first position and said second position of said locking member and having an enlarged head; and a spring trapped between said enlarged head and a surface of said end cap.

3. Apparatus according to claim 1 wherein:

said body portion of said mandrel has a cross-section that is generally that of a right circular cylinder; and said extension has a cross-section that is generally that of a right circular cylinder with a radius less than a radius of an adjacent portion of said body portion of said mandrel; and said extension being co-axial with the adjacent portion of said body portion of said mandrel.

4. Apparatus according to claim 2 wherein:

said body portion of said mandrel has a cross-section that is generally that of a right circular cylinder; and said extension has a cross-section that is generally that of a right circular cylinder with a radius less than a radius of an adjacent portion of said body portion of said mandrel; and said extension being co-axial with the adjacent portion of said body portion of said mandrel.

5. Apparatus according to claim 1 wherein:

said recess and said extension of said mandrel are annular in configuration.

6. Apparatus according to claim 2 wherein:

said recess and said extension of said mandrel are annular in configuration.

7. Apparatus according to claim 3 wherein:

said recess and said extension of said mandrel are annular in configuration.

8. Apparatus according to claim 1 wherein said annular article is a radiator hose and said organic material is an elastomeric material.

* * * * *